United States Patent
Ishikawa

(10) Patent No.: US 11,398,636 B2
(45) Date of Patent: Jul. 26, 2022

(54) FUEL CELL VEHICLE

(71) Applicant: TOYOTA JIDOSHA KABUSHIKI KAISHA, Toyota (JP)

(72) Inventor: Daisuke Ishikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 254 days.

(21) Appl. No.: 16/739,385

(22) Filed: Jan. 10, 2020

(65) Prior Publication Data

US 2020/0251758 A1     Aug. 6, 2020

(30) Foreign Application Priority Data

Jan. 31, 2019  (JP) .............................. JP2019-015107

(51) Int. Cl.
*H01M 8/0432*   (2016.01)
*B60L 50/71*    (2019.01)
*B60K 1/04*     (2019.01)
*H01M 8/04537*  (2016.01)

(52) U.S. Cl.
CPC ........... *H01M 8/04365* (2013.01); *B60K 1/04* (2013.01); *B60L 50/71* (2019.02); *H01M 8/04559* (2013.01); *H01M 8/04589* (2013.01)

(58) Field of Classification Search
CPC .. B60K 15/03; B60K 1/04; B60K 2001/0411; B60K 2001/0416; B60L 50/71; B60R 19/34; F16F 7/12; H01M 8/04; H01M 8/04365; H01M 8/04559; H01M 8/04589; Y02E 60/50; Y02T 10/70; Y02T 10/7072; Y02T 90/14; Y02T 90/40
See application file for complete search history.

(56) References Cited

U.S. PATENT DOCUMENTS

| | | |
|---|---|---|
| 2006/0027406 A1 | 2/2006 | Borroni-Bird et al. |
| 2017/0096172 A1* | 4/2017 | Nagaosa ............... B62D 27/02 |
| 2017/0101031 A1 | 4/2017 | Ohashi |
| 2017/0232829 A1 | 8/2017 | Nishikawa et al. |
| 2018/0170211 A1 | 6/2018 | Koshikawa et al. |
| 2018/0207746 A1 | 7/2018 | Yamaguchi et al. |

FOREIGN PATENT DOCUMENTS

| | | |
|---|---|---|
| EP | 2439128 A1 | 4/2012 |
| JP | 2009137443 A | 6/2009 |
| JP | 2017144859 A | 8/2017 |
| JP | 2018118286 A | 8/2018 |

\* cited by examiner

*Primary Examiner* — Victoria H Lynch

(74) *Attorney, Agent, or Firm* — Dickinson Wright, PLLC

(57) ABSTRACT

A fuel cell vehicle includes: a stack frame providing a fuel cell stack, the stack frame being placed in front of a vehicle cabin; and a fuel tank placed behind the stack frame. The stack frame includes a central member, a right member joined to the central member, a left member joined to the central member, and a front cross member. The front cross member is joined to front edge portions of the central member, the right member, and the left member. A front-end portion of a first joining portion between the central member and the right member and a front-end portion of a second joining portion between the central member and the left member overlap with a third joining portion of the front cross member with the front edge portions of the central member, the right member, and the left member.

7 Claims, 11 Drawing Sheets

FUEL CELL VEHICLE

CROSS-REFERENCE TO RELATED APPLICATIONS

This application claims priority to Japanese Patent Application No. 2019-015107, which is incorporated herein by reference in its entirety.

BACKGROUND

1. Technical Field

The disclosure relates to a fuel cell vehicle, and particularly to a fuel cell vehicle including a stack frame that holds a fuel cell stack.

2. Description of Related Art

Japanese Unexamined Patent Application Publication No. 2017-144859 (JP 2017-144859 A) describes a fuel cell vehicle configured such that a fuel cell stack is fixed on the upper side of a stack frame and provided in front of a vehicle cabin.

SUMMARY

The present inventors came up with a fuel cell vehicle in which a fuel tank is placed below an occupant in order to secure a space inside the vehicle and extend a cruising range, and the present inventors examined the fuel cell vehicle.

The present inventors found the following problems about the above technique. When the fuel cell vehicle receives an impact due to a front-end collision or the like, the fuel tank might collide with a stack frame, so that the fuel tank might be damaged. In a case where the fuel tank collides with a corner of the stack frame, the fuel tank might be damaged.

The present disclosure provides a fuel cell vehicle that restrains breakage of a fuel tank provided in a fuel cell vehicle when the fuel cell vehicle receives an impact and the fuel tank collides with a stack frame.

A first aspect of the disclosure relates to a fuel cell vehicle including a stack frame and a fuel tank. The stack frame is configured such that a fuel cell stack is provided thereon, and the stack frame is placed in front of a vehicle cabin. The stack frame includes a central member, a right member joined to a right edge portion of the central member, a left member joined to a left edge portion of the central member, and a front cross member. The front cross member is joined to front edge portions of the central member, the right member, and the left member. A front-end portion of a first joining portion between the central member and the right member and a front-end portion of a second joining portion between the central member and the left member overlap with a third joining portion of the front cross member with the front edge portions of the central member, the right member, and the left member. The fuel tank is placed behind the stack frame.

In the first aspect, even when the fuel cell vehicle receives an impact and the fuel tank collides with the stack frame, the right member and the left member hit the fuel tank first, so that the rear side of the left member and the rear side of the right member receive respective forces in respective directions to be separated from the central member. The front-end portion of the first joining portion between the central member and the right member and the front-end portion of the second joining portion between the central member and the left member overlap with the third joining portion of the front cross member with the front edge portions of the central member, the right member, and the left member. A rear-end portion of the first joining portion between the central member and the right member and a rear-end portion of the second joining portion between the central member and the left member serve as starting points of breaking, and the left member and the right member are separated from the central member and move to follow the movement of the fuel tank. The fuel tank can be hardly damaged in comparison with a case where the fuel tank collides with a corner of the stack frame. This can accordingly restrain the breakage of the fuel tank.

In the first aspect, a rear-end portion of the central member may be placed in front of a rear-end portion of the right member and a rear-end portion of the left member. Further, the fuel tank may include a front-end portion having a width longer than a distance between the right member and the left member.

With the first configuration, the fuel tank easily hits the right member and the left member without hitting the central member, and the rear side of the left member and the rear side of the right member easily receive respective forces in respective directions to be separated from the central member. Accordingly, the left member and the right member are easily separated from the central member and easily move to follow the movement of the fuel tank, thereby resulting in that the fuel tank can be further hardly damaged.

In the above aspect, the fuel cell vehicle may further include a crash box placed in front of the front cross member. The crash box may be placed between an extension line of a join line between the central member and the right member and an extension line of a join line between the central member and the left member.

With the first configuration, while the center of the front cross member is maintained to be joined to the central member, the opposite ends of the front cross member deform to be separated from the right member and the left member. Accordingly, the left member and the right member easily move to follow the movement of the fuel tank, thereby resulting in that the fuel tank can be further hardly damaged.

Further, the mechanical strength of the first joining portion between the central member and the right member and the mechanical strength of the second joining portion between the central member and the left member may be lower than the mechanical strengths of an outer wall of the fuel tank, the right member, and the left member. Further, the mechanical strengths of the right member and the left member may be higher than the mechanical strength of an outer wall of the fuel tank.

With the first configuration, while the front cross member is maintained to be joined to the central member, the front cross member deforms to be disjoined from the right member and the left member. Accordingly, the left member and the right member easily move to follow the movement of the fuel tank separated from the central member, thereby resulting in that the fuel tank can be further hardly damaged.

A second aspect of the disclosure relates to a fuel cell vehicle including a stack frame and a fuel tank. The stack frame is configured such that a fuel cell stack is provided thereon, and the stack frame is placed behind a vehicle cabin. The stack frame includes a central member, a right member joined to a right edge portion of the central member, a left member joined to a left edge portion of the central member, and a rear cross member. The rear cross member is joined to rear edge portions of the central member, the right member, and the left member. A rear-end portion of a first joining portion between the central member and the right member and a rear-end portion of a second joining portion between the central member and the left member overlap with a third joining portion of the rear cross member with the rear edge portions of the central member, the right member, and the left member. The fuel tank is placed in front of the stack frame.

In the second aspect, even when the fuel cell vehicle receives an impact and the fuel tank collides with the stack frame, the right member and the left member hit the fuel tank first, so that the front side of the left member and the front side of the right member receive respective forces in respective directions to be separated from the central member. The rear-end portion of the first joining portion between the central member and the right member and the rear-end portion of the second joining portion between the central member and the left member overlap with the third joining portion of the rear cross member with the rear edge portions of the central member, the right member, and the left member. A front-end portion of the first joining portion between the central member and the right member and a front-end portion of the second joining portion between the central member and the left member serve as starting points of breaking, and the left member and the right member are separated from the central member and move to follow the movement of the fuel tank. The fuel tank can be hardly damaged in comparison with a case where the fuel tank collides with a corner of the stack frame. This makes it possible to restrain a breakage of the fuel tank.

With each aspect of the disclosure, it is possible to restrain the breakage of the fuel tank due to the stack frame colliding with the fuel tank when the fuel cell vehicle receives an impact.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Concrete embodiments to which the disclosure is applied will be described in detail with reference to the drawings. However, the disclosure is not limited to the following embodiments. Further, the following description and drawings are simplified appropriately for clarification of the description.

Figure 1:
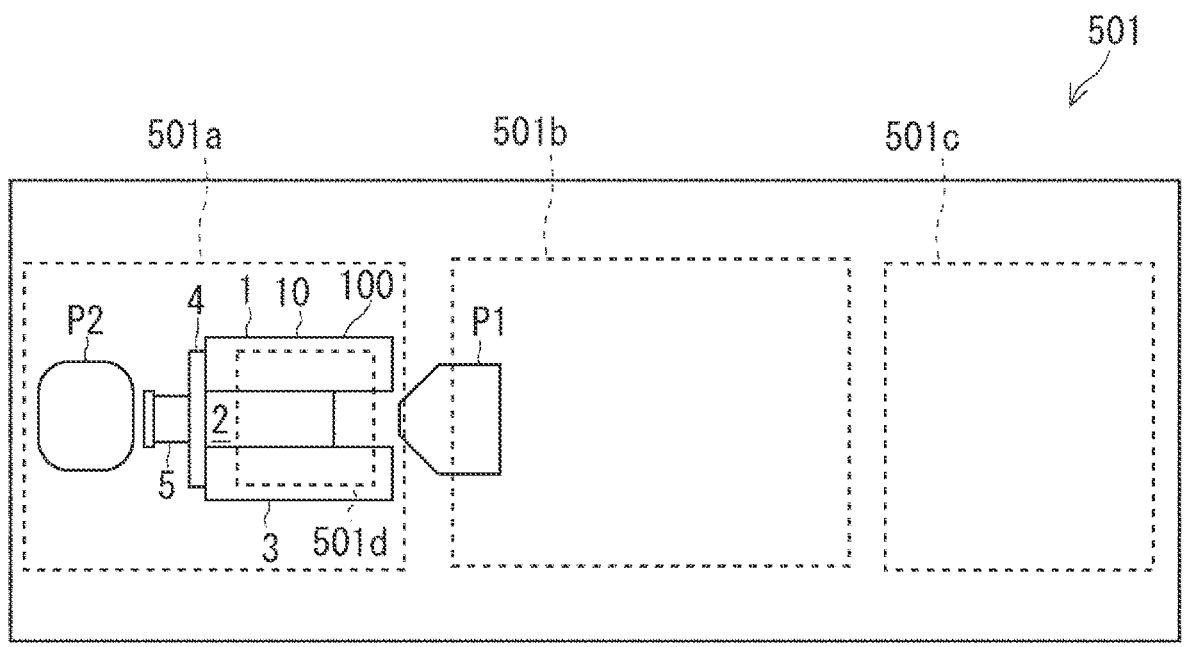
FIG. 1 is a schematic view illustrating a fuel cell vehicle according to a first embodiment of the disclosure.
Figure 1:
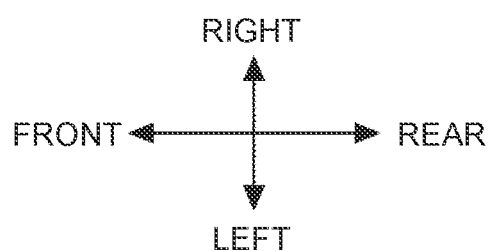
Figure 2:
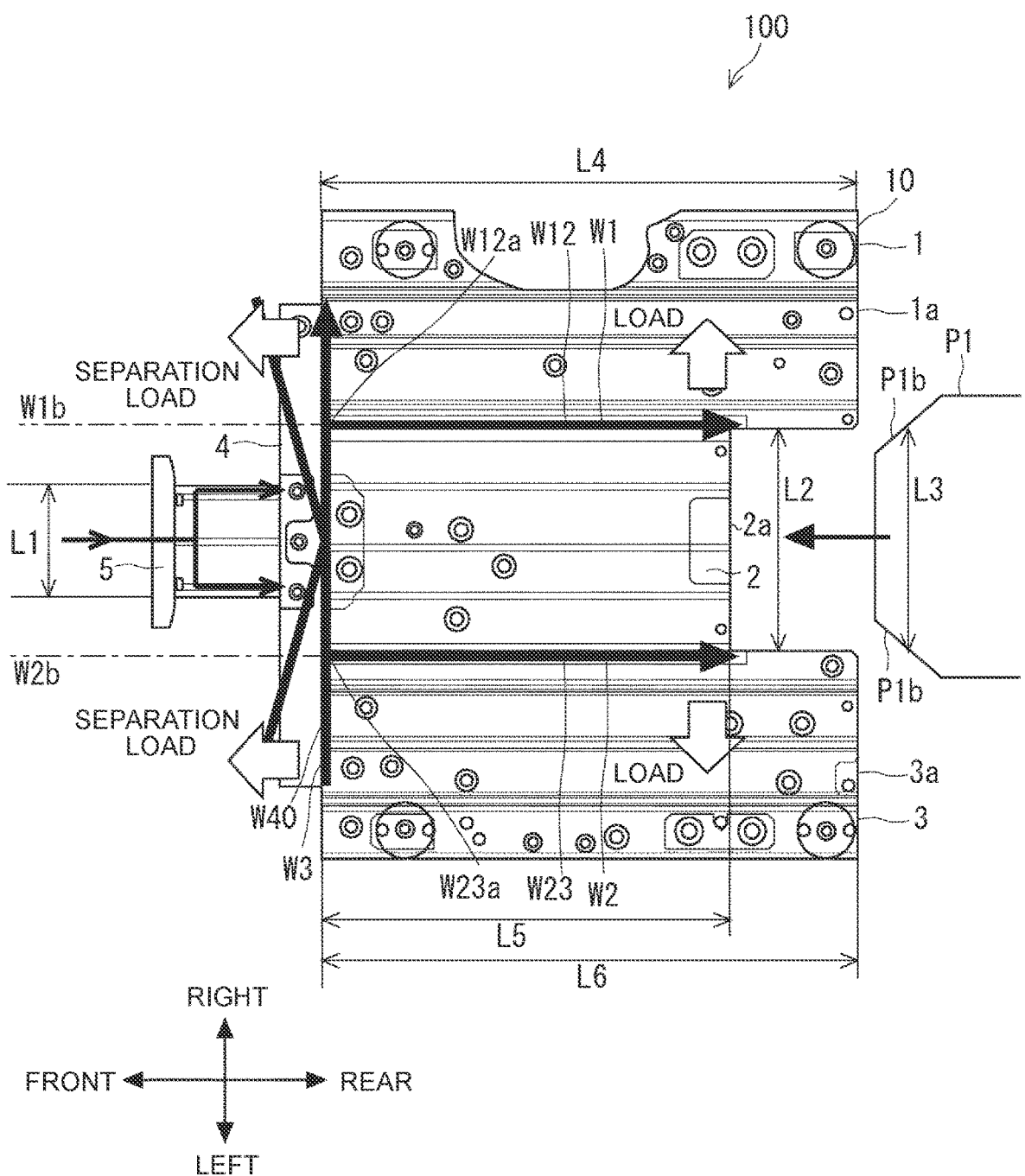
FIG. 2 is a top view illustrating one concrete example of a configuration of an essential part of the fuel cell vehicle according to the first embodiment.
Figure 3:
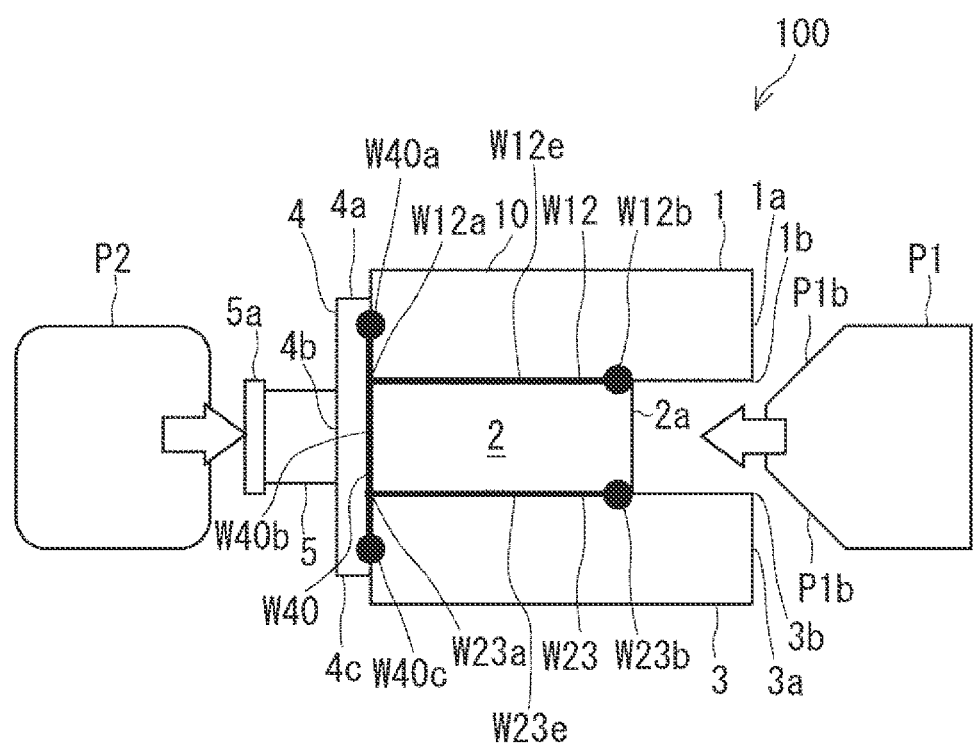
FIG. 3 is a top view schematically illustrating the configuration of the essential part of the fuel cell vehicle according to the first embodiment.
Figure 3:
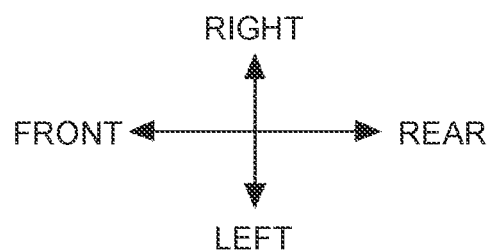
Figure 4:
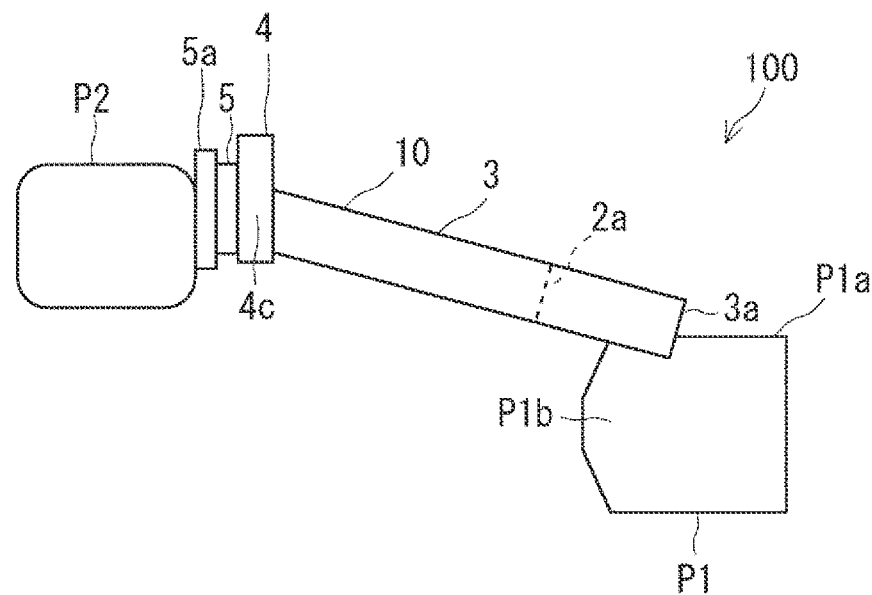
FIG. 4 is a side view schematically illustrating the configuration of the essential part of the fuel cell vehicle according to the first embodiment.
Figure 4:
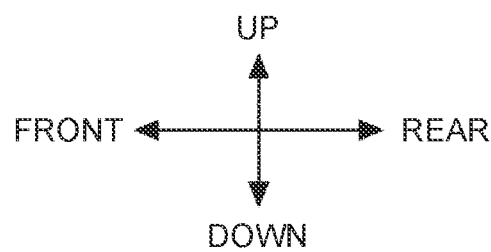
Figure 5:
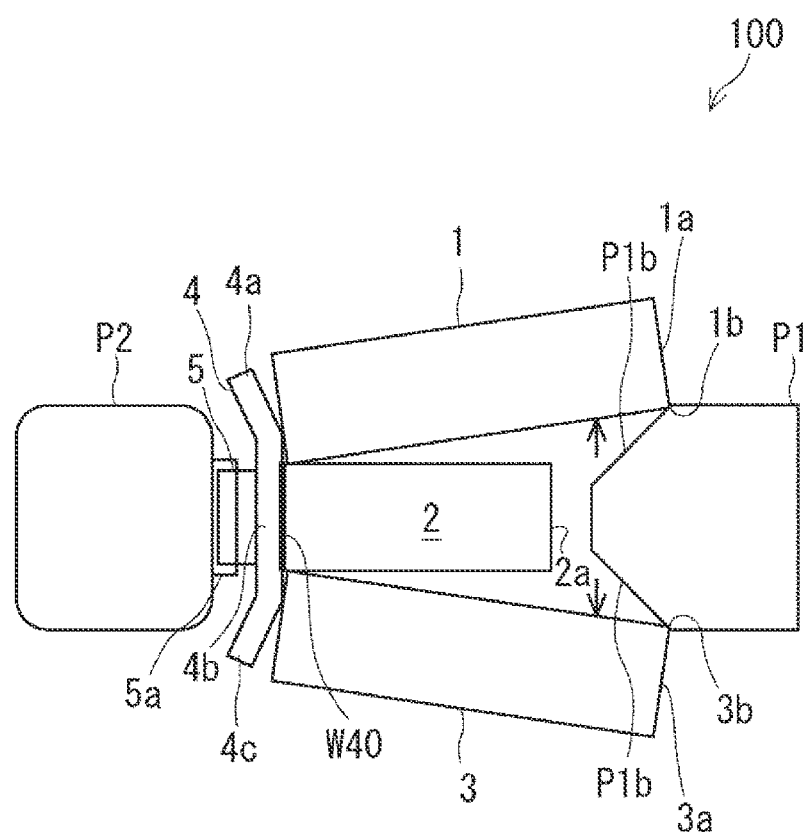
FIG. 5 is a top view schematically illustrating an operation of the essential part in a case where the fuel cell vehicle according to the first embodiment has a collision.
Figure 5:
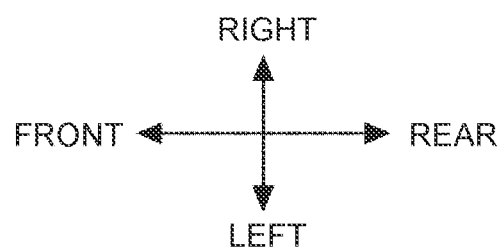
Figure 6:
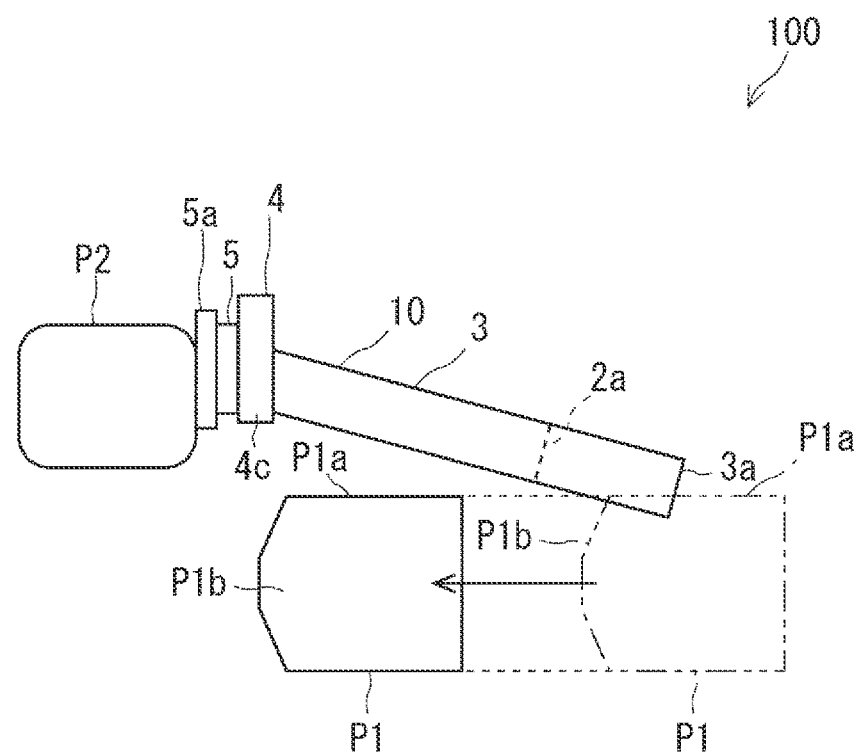
FIG. 6 is a side view schematically illustrating the operation of the essential part in a case where the fuel cell vehicle according to the first embodiment has a collision.
Figure 6:
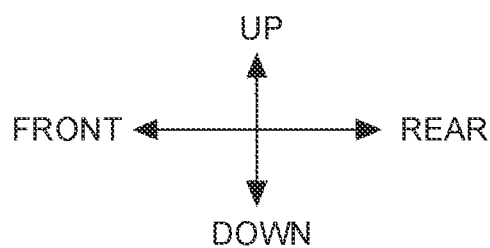

Initially described is a fuel cell vehicle according to a first embodiment of the disclosure with reference to FIGS. 1 to 6. FIG. 1 is a schematic view illustrating a fuel cell vehicle according to the first embodiment. FIG. 2 is a top view illustrating one concrete example of a configuration of an essential part of the fuel cell vehicle according to the first embodiment. FIG. 3 is a top view schematically illustrating the configuration of the essential part of the fuel cell vehicle according to the first embodiment. FIG. 4 is a side view schematically illustrating the configuration of the essential part of the fuel cell vehicle according to the first embodiment. FIG. 4 is a side view schematically illustrating the configuration of the essential part of the fuel cell vehicle illustrated in FIG. 3. FIG. 5 is a top view schematically illustrating an operation of the essential part in a case where the fuel cell vehicle according to the first embodiment has a collision. FIG. 6 is a side view schematically illustrating the operation of the essential part in a case where the fuel cell vehicle according to the first embodiment has a collision.

Note that, naturally, the three-dimensional orthogonal coordinate in FIG. 1 and other drawings indicates the up-down direction, the right-left direction, and the front-rear direction and is illustrated for convenience to describe a positional relationship between constituents. Generally, the upper side of the coordinate is the upper side in the vertical direction, and the plane extending in the front-rear direction and in the right-left direction is a horizontal plane. This is common between the drawings. FIG. 1 is a view of a fuel cell vehicle 501 when the fuel cell vehicle 501 is viewed from above. FIGS. 2, 3, and 5 are views of a stack frame 100 when the stack frame 100 is viewed from above. FIGS. 4 and 6 are views of the stack frame 100 when the stack frame 100 is viewed from its left side. In FIG. 1, for easy understanding, the stack frame 100, a fuel tank P1, and a vehicle component P2 are illustrated in a continuous line.

As illustrated in FIG. 1, the fuel cell vehicle 501 includes a front-side compartment 501a, a vehicle cabin 501b, and a rear-side compartment 501c. The front-side compartment 501a is placed in front of the vehicle cabin 501b, and the rear-side compartment 501c is placed behind the vehicle cabin 501b. The vehicle cabin 501b is a space where an occupant is seated. The fuel cell vehicle 501 includes four wheels (not shown), for example, and the four wheels are provided at four corners of the fuel cell vehicle 501, respectively.

The stack frame 100 is placed in the front-side compartment 501a. A fuel cell stack 501d is provided in the stack frame 100. That is, the fuel cell stack 501d is placed on the upper side of the stack frame 100.

The fuel tank P1 should be placed behind the stack frame 100. More specifically, the fuel tank P1 is placed below the vehicle cabin 501b or behind the front-side compartment

501*a*. Note that, when the fuel cell vehicle 501 has a front-end collision, the fuel tank P1 moves forward so that the fuel tank P1 is not damaged. Hydrogen is stored in the fuel tank P1, for example.

The vehicle component P2 is placed in the front-side compartment 501*a* and placed in front of the stack frame 100. The vehicle component P2 should be a component provided in the fuel cell vehicle and is, for example, a fan motor of a radiator, a front bumper reinforcement, or the like. The vehicle component P2 should have a rigidity higher than that of a crash box 5. Various types of vehicle components, e.g., a front side member, are placed near the vehicle component P2, for example.

As illustrated in FIGS. 2 and 3, the stack frame 100 includes a body portion 10 and the crash box 5. The stack frame 100 may include only the body portion 10.

The body portion 10 includes a right member 1, a central member 2, a left member 3, and a front cross member 4. The body portion 10 may include only the right member 1, the central member 2, the left member 3, and the front cross member 4.

The right member 1, the central member 2, and the left member 3 are placed in this order from the right side to the left side. The right member 1 and the left member 3 sandwich the central member 2 therebetween. A distance between the right member 1 and the left member 3 is smaller than a width L3 of the fuel tank P1. The distance between the right member 1 and the left member 3 is the same length as a width L2 of the central member 2. A front-end portion of the fuel tank P1 should have inclined surfaces P1*b* inclined in the front-rear direction. A rear-end portion 2*a* of the central member 2 is placed in front of a rear-end portion 1*a* of the right member 1 and a rear-end portion 3*a* of the left member 3. As illustrated in FIG. 4, the rear-end portion 2*a* of the central member 2 should be placed above an upper end P1*a* of the fuel tank P1. The right member 1, the central member 2, and the left member 3 should be plate-shaped bodies, and more specifically, extruded members made of aluminum alloy.

The right member 1 and the central member 2 are joined to each other along a join line W1 by friction stir welding (FSW), so that a first joining portion W12 between the right member 1 and the central member 2 is formed. The central member 2 and the left member 3 are joined to each other along a join line W2 by FSW, so that a second joining portion W23 between the central member 2 and the left member 3 is formed. Examples of the join lines W1, W2 illustrated in FIG. 1 are adjacent to each other and extend in parallel to each other. Accordingly, the right member 1 is joined to a right edge portion of the central member 2, and the left member 3 is joined to a left edge portion of the central member 2.

The front cross member 4 should be a bar-shaped body extending in the right-left direction. The front cross member 4 is joined to the right member 1, the central member 2, and the left member 3 along a join line W3 by FSW. The front cross member 4 is joined to front edge portions of the central member 2, the right member 1, and the left member 3, so that a third joining portion W40 is formed. The front cross member 4 includes a right end portion 4*a*, a central portion 4*b*, and a left end portion 4*c*, such that the right end portion 4*a*, the central portion 4*b*, and the left end portion 4*c* extend continuously in this order from the right to the left. The right end portion 4*a* is joined to the right member 1, the central portion 4*b* is joined to the central member 2, and the left end portion 4*c* is joined to the left member 3.

A front-end portion W12*a* of the first joining portion W12 between the central member 2 and the right member 1 and a front-end portion W23*a* of the second joining portion W23 between the central member 2 and the left member 3 overlap with the third joining portion W40 of the front cross member 4 with the front edge portions of the central member 2, the right member 1, and the left member 3. In other words, the front-end portions W12*a*, W23*a* overlap with the join line W3.

The mechanical strength of a rear-end portion W12*b* of the first joining portion W12 is lower than the mechanical strength of a central portion W12*e* of the first joining portion W12. Similarly, the mechanical strength of a rear-end portion W23*b* of the second joining portion W23 is lower than the mechanical strength of a central portion W23*e* of the second joining portion W23. Further, similarly, the mechanical strengths of a right end portion W40*a* and a left end portion W40*c* of the third joining portion W40 are lower than the mechanical strength of a central portion W40*b* of the third joining portion W40.

The mechanical strength of the first joining portion W12 between the right member 1 and the central member 2 and the mechanical strength of the second joining portion W23 between the central member 2 and the left member 3 should be lower than the mechanical strength of an outer wall of the fuel tank P1. Further, the mechanical strengths of the right member 1 and the left member 3 should be higher than the mechanical strength of the outer wall of the fuel tank P1.

Note that, as described above, FSW is used to join the right member 1, the central member 2, the left member 3, and the front cross member 4, but other various types of joining methods can be used. The other various types of joining methods include welding methods such as laser beam welding and arc-welding, for example.

Further, also on the bottom side of the body portion 10, the right member 1, the central member 2, the left member 3, and the front cross member 4 should be joined along join lines similar to the join lines W1, W2, W3, so that joining portions similar to the first joining portion W12, the second joining portion W23 and the third joining portion W40 should be formed. When the stack frame 100 is viewed from above, the joining portions thus formed overlap with the first joining portion W12, the second joining portion W23 and the third joining portion W40.

The crash box 5 is placed in front of the front cross member 4. The crash box 5 is attached to a front-end portion of the body portion 10 via the front cross member 4. In comparison with the body portion 10, the crash box 5 easily deforms when the crash box 5 receives an impact, and thus, the crash box 5 absorbs impact energy. The crash box 5 is a tubular body having a square section, for example. As illustrated in FIG. 2, the crash box 5 is placed between an extension line W1*b* of the join line W1 between the central member 2 and the right member 1 and an extension line W2*b* of the join line W2 between the central member 2 and the left member 3. That is, a width L1 of the crash box 5 is less than a distance between the extension line W1*b* and the extension line W2*b*. In other words, the width L1 is smaller than the width L2 of the central member 2.

Operation

With reference to FIGS. 3 to 6, the following describes an operation of each constituent of the fuel cell vehicle 501 when the stack frame 100 receives a large impact from the front side due to a front end collision or the like of the fuel cell vehicle 501.

As illustrated in FIGS. 3 and 4, when the fuel cell vehicle 501 has a front-end collision, the stack frame 100 receives a large impact from the front side. More specifically, the vehicle component P2 abuts with a distal end portion 5a of the crash box 5, so that the crash box 5 is sandwiched between the vehicle component P2 and the body portion 10 and deforms by compression. In the meantime, the fuel tank P1 moves forward and makes contact with the right member 1 and the left member 3. Note that the inclined surfaces P1b of the front-end portion of the fuel tank P1 should abut with corners 1b, 3b, on the central member 2 side, of rear ends of the right member 1 and the left member 3.

As illustrated in FIG. 5, the right member 1 and the left member 3 receive respective forces by the fuel tank P1 in respective directions to be separated from the central member 2.

As described above, the mechanical strength of the rear-end portion W12b of the first joining portion W12 is lower than the mechanical strength of the central portion W12e of the first joining portion W12. Further, since the front-end portion W12a of the first joining portion W12 overlaps with the join line W3, the mechanical strength of the front-end portion W12a of the first joining portion W12 is higher than the mechanical strength of the rear-end portion W12b. Accordingly, the rear-end portion W12b easily becomes a starting point of breaking of the first joining portion W12. The right member 1 is disjoined from the central member 2, so that the rear side of the right member 1 is separated from the central member 2.

Similarly, the mechanical strength of the rear-end portion W23b of the second joining portion W23 is lower than the mechanical strength of the central portion W23e of the second joining portion W23. Further, since the front-end portion W23a of the second joining portion W23 overlaps with the join line W3, the mechanical strength of the front-end portion W23a of the second joining portion W23 is higher than the mechanical strength of the rear-end portion W23b. Accordingly, the rear-end portion W23b easily becomes a starting point of breaking of the second joining portion W23. The left member 3 is disjoined from the central member 2, so that the rear side of the left member 3 is separated from the central member 2.

Similarly, the mechanical strengths of the right end portion W40a and the left end portion W40c of the third joining portion W40 are lower than the mechanical strength of the central portion W40b of the third joining portion W40. Accordingly, the right end portion W40a and the left end portion W40c easily become starting points of breaking of the joining portion W40. On this account, while the central portion 4b of the front cross member 4 is maintained to be joined to the central member 2, the right end portion 4a of the front cross member 4 deforms to be separated from the right member 1, so that the right end portion 4a is disjoined from the right member 1. Further, the left end portion 4c of the front cross member 4 deforms to be separated from the left member 3, so that the left end portion 4c is disjoined from the left member 3. In other words, the right end portion 4a and the left end portion 4c bend from the central portion 4b, so that the front cross member 4 deforms into a generally C-shape. Hereby, the right member 1 and the left member 3 easily deform so as to be separated from the fuel tank P1 and the central member 2.

As illustrated in FIG. 6, the fuel tank P1 further moves forward and passes below the rear-end portion 2a of the central member 2, so that the fuel tank P1 moves to a region below the body portion 10.

As described above, the right member 1 and the left member 3 deform to follow the movement of the fuel tank P1. On this account, in such a case, even if the fuel tank P1 collides with the stack frame 100, the fuel tank P1 can be hardly damaged in comparison with a case where the right member 1 and the left member 3 are maintained to be joined to the central member 2. Accordingly, it is possible to restrain the breakage of the fuel tank P1 due to the stack frame 100 colliding with the fuel tank P1.

Further, the rear-end portion 2a of the central member 2 in the present embodiment is placed in front of the rear-end portion 1a of the right member 1 and the rear-end portion 3a of the left member 3. Further, the stack frame 100 of the present embodiment is constituted by the central member 2, the right member 1, the left member 3, and the front cross member 4. Further, the fuel tank P1 of the present embodiment includes the front-end portion having the width L3 longer than the distance between the right member 1 and the left member 3. Hereby, the right member 1 and the left member 3 easily hit the fuel tank P1, so that the rear side of the left member 3 and the rear side of the right member 1 easily receive respective forces in respective directions to be separated from the central member 2. Accordingly, the left member 3 and the right member 1 are easily separated from the central member 2 and easily move to follow the movement of the fuel tank P1, thereby resulting in that the fuel tank P1 can be further hardly damaged.

Further, the fuel cell vehicle 501 of the present embodiment further includes the crash box 5 placed in front of the front cross member 4. Further, as illustrated in FIG. 2, the crash box 5 of the present embodiment is placed between the extension line W1b of the join line W1 between the central member 2 and the right member 1 and the extension line W2b of the join line W2 between the central member 2 and the left member 3. Hereby, while the central portion 4b of the front cross member 4 is maintained to be joined to the central member 2, the right end portion 4a and the left end portion 4c easily deform such that the right end portion 4a is separated from the right member 1 and the left end portion 4c is separated from the left member 3. On this account, the right member 1 and the left member 3 easily move to follow the movement of the fuel tank P1, thereby resulting in that the fuel tank P1 can be further hardly damaged.

Further, the mechanical strength of the first joining portion W12 between the central member 2 and the right member 1 and the mechanical strength of the second joining portion W23 between the central member 2 and the left member 3 in the present embodiment are lower than the mechanical strengths of the outer wall of the fuel tank P1, the right member 1, and the left member 3. On this account, the first joining portion W12 between the right member 1 and the central member 2 and the second joining portion W23 between the left member 3 and the central member 2 are easily broken in comparison with the outer wall of the fuel tank P1, the right member 1, and the left member 3. On this account, the right member 1 and the left member 3 are easily separated from the central member 2 and easily move to follow the movement of the fuel tank P1, thereby resulting in that the fuel tank P1 can be further hardly damaged.

Figure 7:
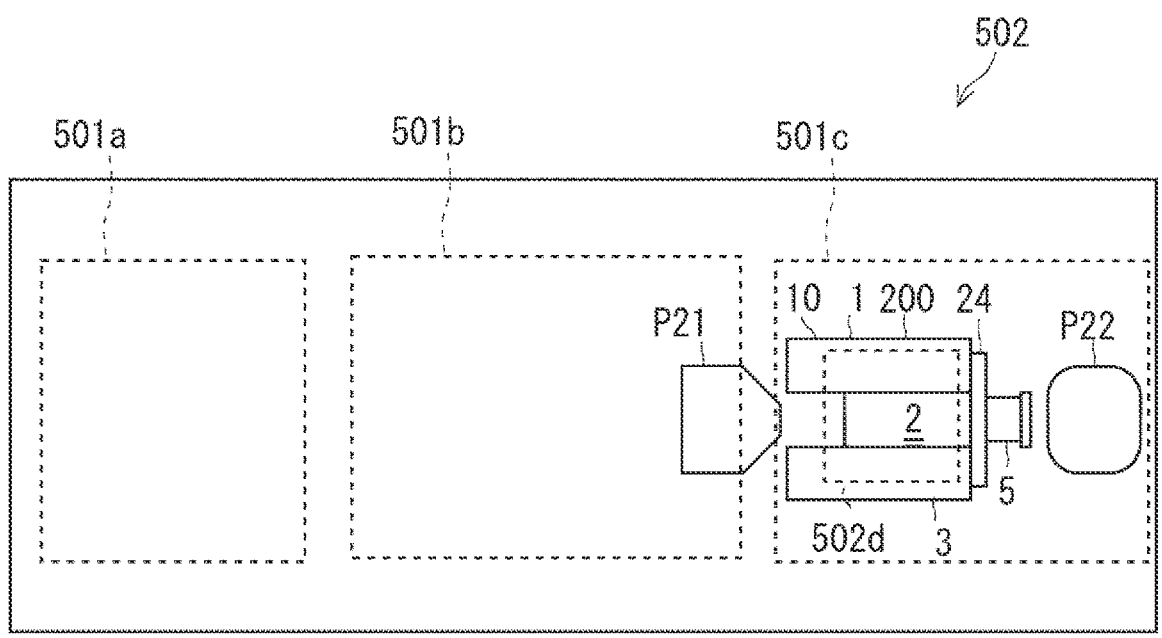
FIG. 7 is a schematic view illustrating a fuel cell vehicle according to a second embodiment of the disclosure.
Figure 7:
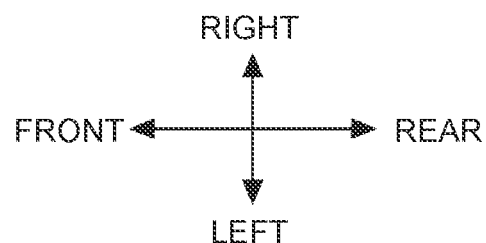
Figure 8:
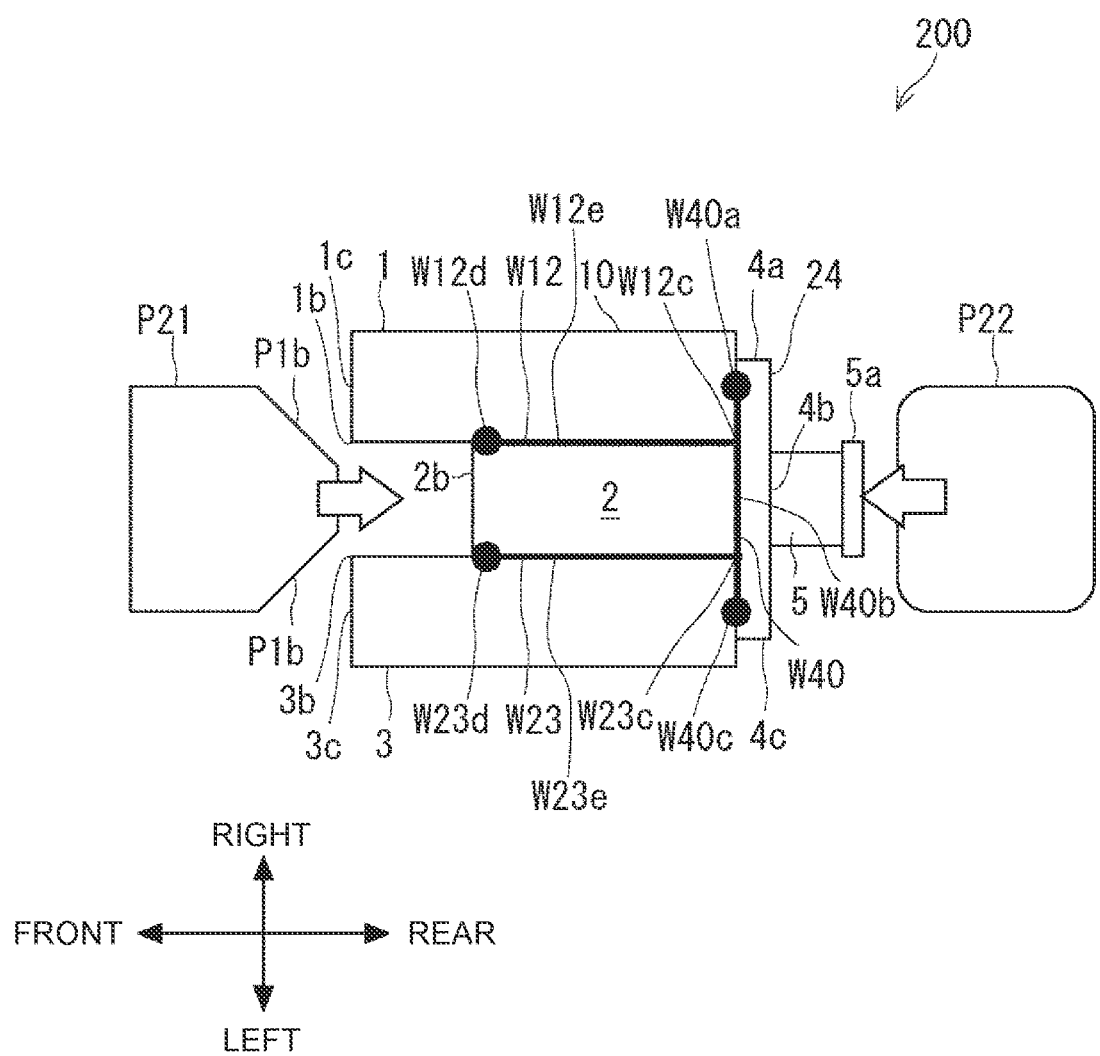
FIG. 8 is a top view schematically illustrating a configuration of an essential part of the fuel cell vehicle according to the second embodiment.
Figure 9:
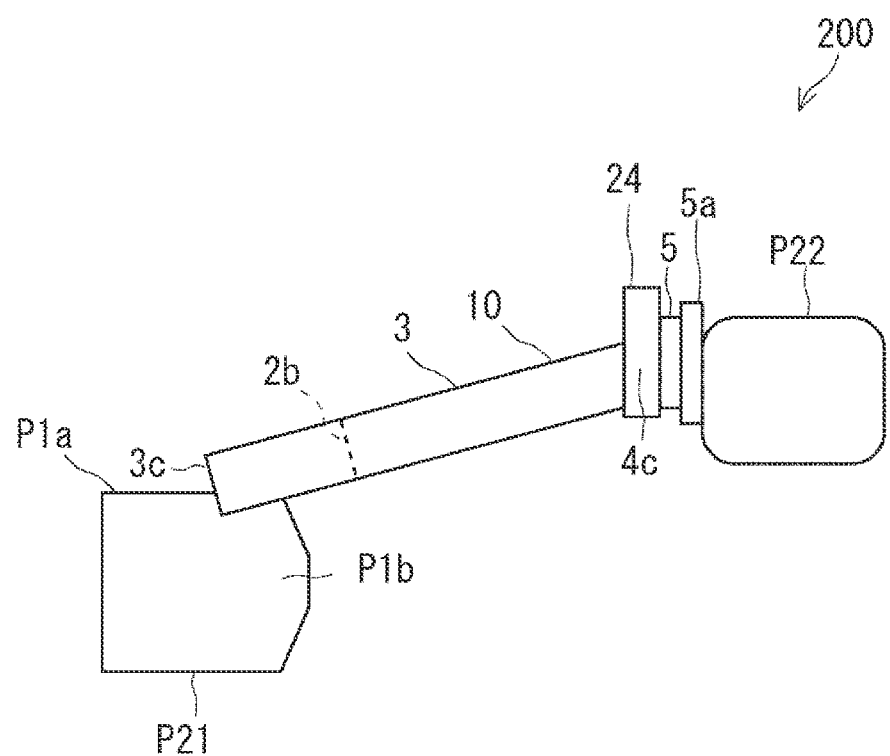
FIG. 9 is a side view schematically illustrating the configuration of the essential part of the fuel cell vehicle according to the second embodiment.
Figure 9:
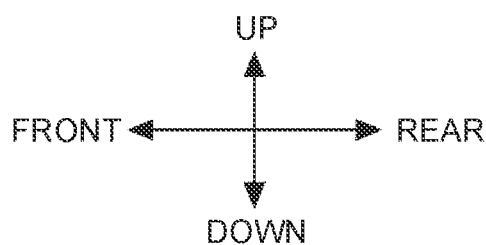
Figure 10:
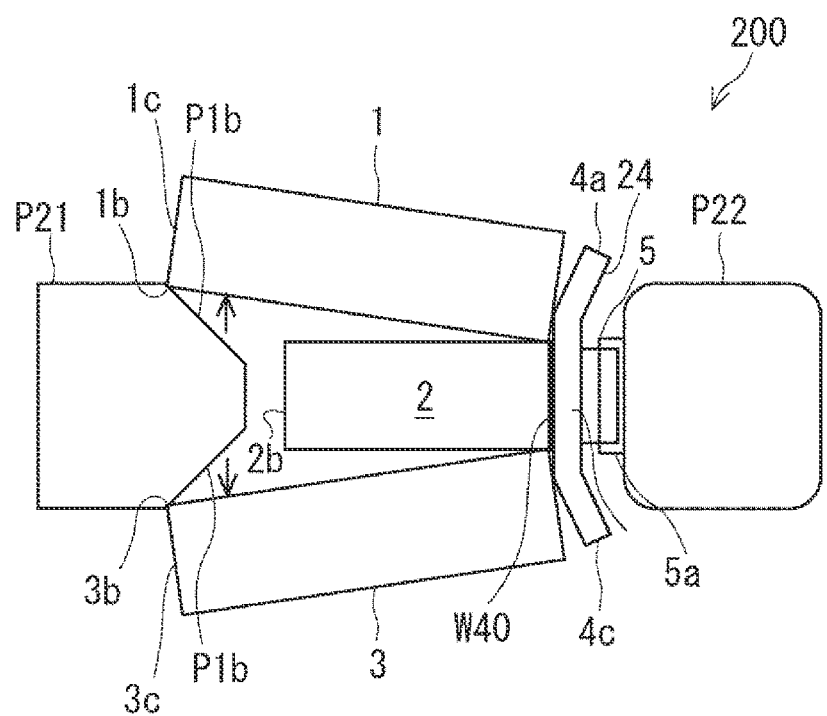
FIG. 10 is a top view schematically illustrating an operation of the essential part in a case where the fuel cell vehicle according to the second embodiment has a collision.
Figure 10:
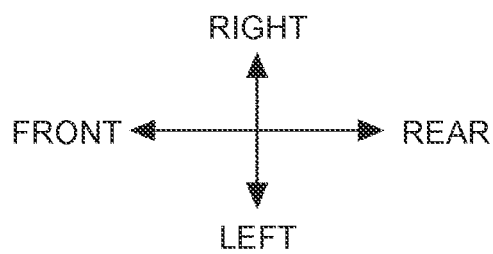
Figure 11:
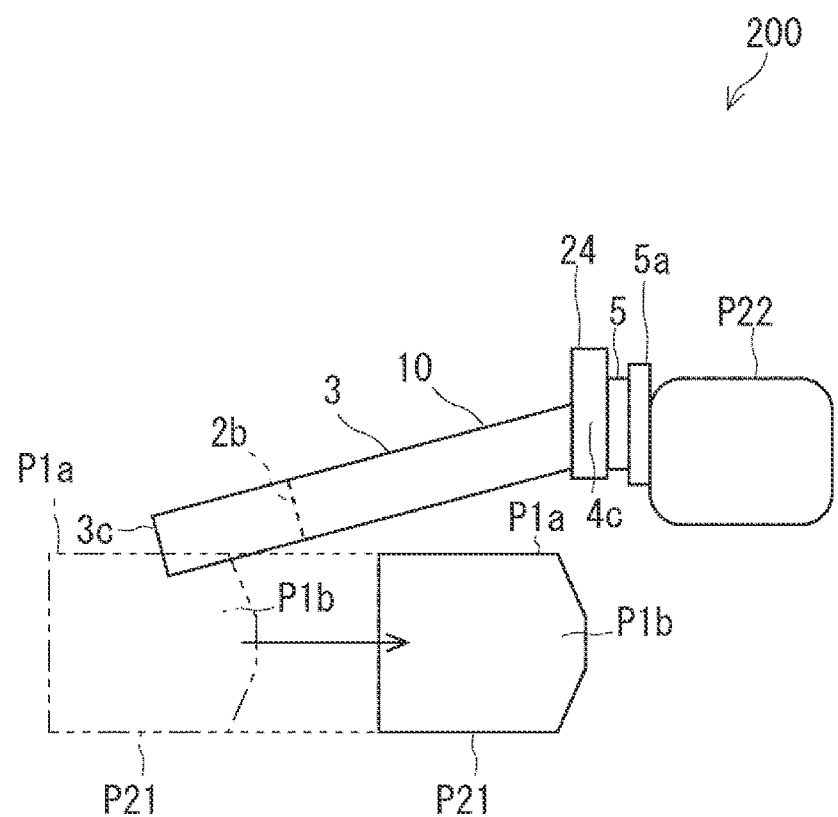
FIG. 11 is a side view schematically illustrating the operation of the essential part in a case where the fuel cell vehicle according to the second embodiment has a collision.
Figure 11:
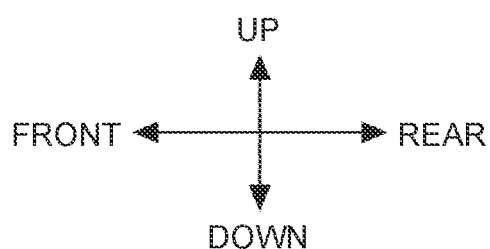

Next will be described a fuel cell vehicle according to a second embodiment of the disclosure with reference to FIGS. 7 to 11. The fuel cell vehicle of the second embodiment has a configuration generally the same as the fuel cell vehicle of the first embodiment except for the position of the stack frame. FIG. 7 is a schematic view illustrating the fuel cell vehicle according to the second embodiment. FIG. 8 is a top view schematically illustrating a configuration of an essential part of the fuel cell vehicle according to the second embodiment. FIG. 9 is a side view schematically illustrating the configuration of the essential part of the fuel cell vehicle according to the second embodiment. FIG. 9 is a side view schematically illustrating the configuration of the essential part of the fuel cell vehicle illustrated in FIG. 8. FIG. 10 is a top view schematically illustrating an operation of the essential part in a case where the fuel cell vehicle according to the second embodiment has a collision. FIG. 11 is a side view schematically illustrating the operation of the essential part in a case where the fuel cell vehicle according to the second embodiment has a collision.

FIG. 7 is a view of a fuel cell vehicle 502 when the fuel cell vehicle 502 is viewed from above. FIGS. 8 and 10 are views of a stack frame 200 when the stack frame 200 is viewed from above. FIGS. 9 and 11 are views of the stack frame 200 when the stack frame 200 is viewed from its left side. In FIG. 7, for easy understanding, the stack frame 200, a fuel tank P21, and a vehicle component P22 are illustrated in a continuous line.

As illustrated in FIG. 7, similarly to the fuel cell vehicle 501 illustrated in FIG. 1, the fuel cell vehicle 502 includes the front-side compartment 501a, the vehicle cabin 501b, and the rear-side compartment 501c. The fuel cell vehicle 502 includes four wheels (not shown), for example, and the four wheels are provided at four corners of the fuel cell vehicle 502, respectively.

The stack frame 200 is placed in the rear-side compartment 501c. A fuel cell stack 502d is provided in the stack frame 200. That is, the fuel cell stack 502d is placed on the upper side of the stack frame 200.

The fuel tank P21 should be placed in front of the stack frame 200. More specifically, the fuel tank P21 is placed below the vehicle cabin 501b or in front of the rear-side compartment 501c. Note that the fuel tank P21 is placed such that, when the fuel cell vehicle 502 has a rear end collision, the fuel tank P21 moves rearward so that the fuel tank P21 is not damaged. The fuel tank P21 has the same configuration as the fuel tank P1.

The vehicle component P22 is placed in the rear-side compartment 501c and placed behind the stack frame 200. The vehicle component P22 should be a component provided in the fuel cell vehicle and is, for example, a rear bumper reinforcement or the like. The vehicle component P22 should have a rigidity higher than the crash box 5.

As illustrated in FIG. 8, the stack frame 200 has the same configuration as the stack frame 100, but the stack frame 200 is placed in the same orientation in the right-left direction as the stack frame 100 but is reverse to the stack frame 100 in the front-rear direction. Therefore, the stack frame 200 has a configuration with reference signs different from those in the configuration of the stack frame 100 but has substantially the same configuration as the stack frame 100 except that the stack frame 200 is reverse to the stack frame 100 in the front-rear direction. For example, the central member 2 includes a front-end portion 2b having the same configuration as the rear-end portion 2a illustrated in FIG. 3. A rear cross member 24 has the same configuration as the front cross member 4, while the rear cross member 24 is reverse to the front cross member 4 in the front-rear direction. Further, the first joining portion W12 between the central member 2 and the right member 1 includes a rear-end portion W12c having the same configuration as the front-end portion W12a illustrated in FIG. 3. Further, the second joining portion W23 between the central member 2 and the left member 3 includes a rear-end portion W23c having the same configuration as the front-end portion W23a illustrated in FIG. 3.

The rear-end portion W12c of the first joining portion W12 between the central member 2 and the right member 1 and the rear-end portion W23c of the second joining portion W23 between the central member 2 and the left member 3 overlap with the third joining portion W40 of the rear cross member 24 with rear edge portions of the central member 2, the right member 1, and the left member 3. In other words, the rear-end portions W12c, W23c overlap with the join line W3.

The mechanical strength of the rear end portion W12c of the first joining portion W12 is lower than the mechanical strength of the central portion W12e of the first joining portion W12. Similarly, the mechanical strength of the rear end portion W23c of the second joining portion W23 is lower than the mechanical strength of the central portion W23e of the second joining portion W23.

The crash box 5 is placed behind the rear cross member 24. The crash box 5 is attached to a rear-end portion of the body portion 10 via the rear cross member 24.

Note that, in order that the stack frame 200 is placed in the rear-side compartment 501c, the stack frame 200 may have a configuration different from that of the stack frame 100 appropriately so that the stack frame 200 is fitted to a configuration of the rear-side compartment 501c and its surrounding configuration.

With reference to FIGS. 8 to 11, the following describes an operation of each constituent of the fuel cell vehicle 502 when the stack frame 200 receives a large impact from the rear side due to a rear end collision or the like of the fuel cell vehicle 502.

As illustrated in FIGS. 8 and 9, when the fuel cell vehicle 502 has a rear end collision, for example, the stack frame 200 receives a large impact from the rear side. More specifically, the vehicle component P22 abuts with the distal end portion 5a of the crash box 5, so that the crash box 5 is sandwiched between the vehicle component P22 and the body portion 10 and deforms by compression. In the meantime, the fuel tank P21 moves rearward and makes contact with the right member 1 and the left member 3. Note that the inclined surfaces P1b of a rear-end portion of the fuel tank P21 should abut with the corners 1b, 3b, on the central member 2 side, of front ends of the right member 1 and the left member 3.

As illustrated in FIG. 10, the right member 1 and the left member 3 receive respective forces by the fuel tank P21 in respective directions to be distanced from the central member 2.

As described above, the mechanical strength of a front-end portion W12d of the first joining portion W12 is lower than the mechanical strength of the central portion W12e of the first joining portion W12. Further, since the rear-end portion W12c of the first joining portion W12 overlaps with the join line W3, the mechanical strength of the rear-end portion W12c of the first joining portion W12 is higher than the mechanical strength of the front-end portion W12d. Accordingly, the front-end portion W12d easily becomes a starting point of breaking of the first joining portion W12. The right member 1 is disjoined from the central member 2, so that the front side of the right member 1 is separated from the central member 2.

Similarly, the mechanical strength of a front-end portion W23d of the second joining portion W23 is lower than the mechanical strength of the central portion of the second joining portion W23. Further, since the rear-end portion W23c of the second joining portion W23 overlaps with the join line W3, the mechanical strength of the rear-end portion W23c of the second joining portion W23 is higher than the mechanical strength of the front-end portion W23d. Accordingly, the front-end portion W23d easily becomes a starting point of breaking of the second joining portion W23. The left member 3 is disjoined from the central member 2, so that the front side of the left member 3 is separated from the central member 2.

Similarly, the mechanical strengths of the right end portion W40a and the left end portion W40c of the third joining portion W40 are lower than the mechanical strength of the central portion W40b of the third joining portion W40. Accordingly, the right end portion W40a and the left end portion W40c easily become starting points of breaking of the third joining portion W40. Accordingly, while the central portion 4b of the rear cross member 24 is maintained to be joined to the central member 2, the right end portion 4a of the rear cross member 24 deforms to be separated from the right member 1, and the right end portion 4a is disjoined from the right member 1. Further, the left end portion 4c of the rear cross member 24 deforms to be separated from the left member 3, and the left end portion 4c is disjoined from the left member 3. In other words, the right end portion 4a and the left end portion 4c bend from the central portion 4b, so that the rear cross member 24 deforms into a generally C-shape. Hereby, the right member 1 and the left member 3 easily deform so as to be separated from the fuel tank P21 and the central member 2.

As illustrated in FIG. 11, the fuel tank P21 further moves rearward and passes below the front-end portion 2b of the central member 2, and then, the fuel tank P21 moves to a region below the body portion 10.

Thus, the right member 1 and the left member 3 deform to follow the movement of the fuel tank P21. On this account, in such a case, even if the fuel tank P21 collides with the stack frame 200, the fuel tank P21 can be hardly damaged in comparison with a case where the right member 1 and the left member 3 are maintained to be joined to the central member 2. Accordingly, it is possible to restrain the breakage of the fuel tank P21 due to the stack frame 200 colliding with the fuel tank P21.

Further, the front-end portion 2b of the central member 2 in the present embodiment is placed behind the front-end portion 1c of the right member 1 and the front-end portion 3c of the left member 3. Further, the stack frame 200 of the present embodiment is constituted by the central member 2, the right member 1, the left member 3, and the rear cross member 24. Further, the fuel tank P21 of the present embodiment includes the front-end portion having the width L3 longer than the width L2 of the central member 2. Hereby, the right member 1 and the left member 3 easily hit the fuel tank P21, so that the front side of the left member 3 and the front side of the right member 1 easily receive respective forces in respective directions to be separated from the central member 2. Accordingly, the left member 3 and the right member 1 are easily separated from the central member 2 and easily move to follow the movement of the fuel tank P21, thereby resulting in that the fuel tank P21 can be further hardly damaged.

Further, the fuel cell vehicle 502 of the present embodiment further includes the crash box 5 placed in front of the rear cross member 24. Further, as illustrated in FIG. 2, the crash box 5 of the present embodiment is placed between the extension line W1b of the join line W1 between the central member 2 and the right member 1 and the extension line W2b of the join line W2 between the central member 2 and the left member 3. Hereby, while the central portion 4b of the rear cross member 24 is maintained to be joined to the central member 2, the right end portion 4a of the rear cross member 24 and the left end portion 4c of the rear cross member 24 easily deform such that the right end portion 4a is separated from the right member 1 and the left end portion 4c is separated from the left member 3. Accordingly, the right member 1 and the left member 3 easily move to follow the movement of the fuel tank P21, thereby resulting in that the fuel tank P21 can be further hardly damaged.

Further, the mechanical strength of the first joining portion W12 between the central member 2 and the right member 1 and the mechanical strength of the second joining portion W23 between the central member 2 and the left member 3 in the present embodiment are lower than the mechanical strengths of the outer wall of the fuel tank P21, the right member 1, and the left member 3. On this account, the first joining portion W12 between the right member 1 and the central member 2 and the second joining portion W23 between the left member 3 and the central member 2 are easily broken in comparison with the outer wall of the fuel tank P21, the right member 1, and the left member 3. Accordingly, the right member 1 and the left member 3 easily move to follow the movement of the fuel tank P21 separated from the central member 2, thereby resulting in that the fuel tank P21 can be further hardly damaged.

Note that the disclosure is not limited to the above embodiments, and various modifications can be made appropriately within a range that does not deviate from the gist of the disclosure.

What is claimed is:

1. A fuel cell vehicle comprising:
    a stack frame on which a fuel cell stack is provided, the stack frame being placed in front of a vehicle cabin,
        the stack frame including a central member, a right member joined to a right edge portion of the central member, a left member joined to a left edge portion of the central member, and a front cross member,
        the front cross member being joined to front edge portions of the central member, the right member, and the left member,
    a front-end portion of a first joining portion between the central member and the right member and a front-end portion of a second joining portion between the central member and the left member being overlapping with a third joining portion of the front cross member with the front edge portions of the central member, the right member, and the left member; and
    a fuel tank placed behind the stack frame.

2. The fuel cell vehicle according to claim 1, wherein a rear-end portion of the central member is placed in front of a rear-end portion of the right member and a rear-end portion of the left member.

3. The fuel cell vehicle according to claim 1, wherein the fuel tank includes a front-end portion having a width longer than a distance between the right member and the left member.

4. The fuel cell vehicle according to claim 1, further comprising a crash box placed in front of the front cross member, the crash box being placed between an extension line of a join line between the central member and the right member and an extension line of a join line between the central member and the left member.

5. The fuel cell vehicle according to claim 1, wherein a mechanical strength of the first joining portion between the central member and the right member and a mechanical strength of the second joining portion between the central member and the left member are lower than mechanical strengths of an outer wall of the fuel tank, the right member, and the left member.

6. The fuel cell vehicle according to claim 1, wherein mechanical strengths of the right member and the left member are higher than a mechanical strength of an outer wall of the fuel tank.

7. A fuel cell vehicle comprising:
a stack frame on which a fuel cell stack is provided, the stack frame being placed behind a vehicle cabin,
the stack frame including a central member, a right member joined to a right edge portion of the central member, a left member joined to a left edge portion of the central member, and a rear cross member,
the rear cross member being joined to rear edge portions of the central member, the right member, and the left member,
a rear-end portion of a first joining portion between the central member and the right member and a rear-end portion of a second joining portion between the central member and the left member being overlapping with a third joining portion of the rear cross member with the rear edge portions of the central member, the right member, and the left member; and
a fuel tank placed in front of the stack frame.

* * * * *